United States Patent [19]

Greive et al.

[11] Patent Number: 5,718,825
[45] Date of Patent: Feb. 17, 1998

[54] LIQUID FILTER, IN PARTICULAR FUEL OR OIL FILTER

[75] Inventors: Michael Greive, Muenster; Wilhelm Ardes, Ascheberg, both of Germany

[73] Assignee: Ing. Walter Hengst GmbH & Co. KG, Muenster, Germany

[21] Appl. No.: 568,635

[22] Filed: Dec. 7, 1995

[30] Foreign Application Priority Data

Dec. 9, 1994 [DE] Germany ................. 44 43 581.9

[51] Int. Cl.⁶ ............................................. B01D 35/16
[52] U.S. Cl. .................... 210/298; 210/299; 210/435; 210/493.2; 210/484
[58] Field of Search .......................... 210/299, 407, 210/435, 484, 315, 450, 248, 298, 305, 440, 455, 493.2, 523; 55/295, 296, 300, 433

[56] References Cited

U.S. PATENT DOCUMENTS

| 3,000,506 | 9/1961 | Hultgren | 210/DIG. 17 |
| 3,054,507 | 9/1962 | Humbert, Jr. et al. | 210/440 |
| 3,224,583 | 12/1965 | Rosaen | 210/315 |
| 3,288,291 | 11/1966 | Rosaen | 210/248 |
| 3,397,786 | 8/1968 | Hultgren | 210/440 |
| 3,561,604 | 2/1971 | Yotsumoto | 210/484 |
| 4,108,775 | 8/1978 | Wilkes et al. | 210/299 |
| 5,085,769 | 2/1992 | Klausen et al. | 210/299 |

FOREIGN PATENT DOCUMENTS

| 1177350 | 4/1959 | France | 210/484 |
| 2226254 | 6/1990 | United Kingdom | 210/450 |

Primary Examiner—Mathew O. Savage
Attorney, Agent, or Firm—Hill, Steadman & Simpson.

[57] ABSTRACT

A liquid filter, such as an oil or gas filter, is provided which has a cup-shaped cylindrical filter housing to be mounted in a vertical orientation, with a releasable cover closing the filter housing. A liquid inlet passage and a liquid outlet passage are provided at the housing. A replaceable, substantially hollow cylindrical filter insert is vertically arranged in the housing. The filter insert being formed of a filter material member arranged between an upper and a lower disc. A collar, which is impervious to solid contaminants removed by the filter material member, extends from the lower disc upwardly along a part of the height of the filter insert, surrounding an outer circumference of the filter insert member. In this manner a collection chamber is formed for the filtered solid particles at the lower disc.

11 Claims, 2 Drawing Sheets

LIQUID FILTER, IN PARTICULAR FUEL OR OIL FILTER

BACKGROUND OF THE INVENTION

The invention relates to a liquid filter, in particular a fuel or oil filter, with a cup-shaped filter housing substantially arranged standing up in operation, with a releasable cover closing the filter housing, with at least one liquid intake passage and a return passage, and with a replaceable substantially hollow-cylindrical filter insert arranged in the filter housing, with the filter insert having a filter material member arranged between two front discs.

Liquid filters and appertaining filter inserts of the kind mentioned above are well known, e.g., they are used in internal combustion vehicle engines. During operation of the liquid filter, the liquid to be filtered flows through the filter material member, wherein solid particles carried by the liquid settle at the filter material member, while the liquid passes through the filter material member and thus is filtered. In many applications, e.g., as mentioned in internal combustion engines, the liquid filters are operated discontinuously, i.e., there are idle periods between separate operation periods. During the idle periods there is no liquid flowing within the liquid filter such that solid particles separated in the filter material member may move downwards under the influence of gravity in the stationary liquid in the liquid filter and collect in the lower part of the filter insert at the front disc provided there. After having reached a certain amount of particles, at least a part of the solid particles will fall over the radially outer edge of the lower front disc and will proceed to the area of the liquid filter positioned below the filter insert or the appertaining filter housing, respectively. With liquid filters comprising a return passage in this area of the filter housing, the sunk solid particles may even proceed back to a collecting tank for the liquid to be filtered, e.g., a fuel tank or a motor oil sump. The solid particles in this case are not permanently removed out of the liquid but only flow with it, backwards and forwards. A further problem with known filter inserts of liquid filters of the kind mentioned above is that when removing the used up filter insert, the solid particles filtered out by the filter material member are rinsed off and thus are separated from the filter insert and remain in the filter housing. After inserting a new filter insert and resuming the operation of the liquid filter again, often solid particles sunk in the lower part of the filter housing or flowed into it, are again transported with the flowing liquid to the filter material member, such that the filter material member, immediately after the replacement thereof, is again loaded with a considerable amount of dirt. This will diminish the effective surface of the flow through cross-section for the filter insert shortly after the replacement thereof and will decrease the maximal possible operation time thereof.

SUMMARY OF THE INVENTION

Therefore it is an object to provide a liquid filter and an appertaining filter insert of the kind mentioned above, wherein the disadvantages mentioned are avoided and it is guaranteed that the filtered solid contaminants, once removed from the liquid to be filtered, may not proceed again in an uncontrolled fashion into the lower parts of the filter housing of the liquid filter during an idle period of the liquid filter or when replacing the filter insert, but will remain in or at the filter insert.

According to the invention this object is attained with a liquid filter and a filter insert of the kind mentioned above with the provision of a collar extending from the lower front disc along a part of the height of the filter insert, surrounding an outer circumference of the filter material member.

It is advantageously attained with the invention that in the lower part of the filter insert, a collection chamber for the solid particles filtered in the filter material member is formed which the solid particles may not leave after they have sunk downwards. Thereby it is guaranteed that during the operation of the liquid filter, the filtered solid particles in any case will remain within the filter insert and are removed together with the used up filter insert, out of the liquid filter, when replacing the filter insert. Thereby also, a new filter insert is prevented from being exposed to "old" solid particles which were once filtered out of the liquid by the filter insert previously used. Thereby a new filter insert will keep its large effective flow cross-section, resulting in an enlargement of the maximal possible operation period.

In order to also remove those solid particles settling at the inner surface of the filter housing during the operation of the liquid filter, when removing the filter insert from the filter housing, it is proposed that the collar comprises inwardly elastically flexible and resilient wings pointing outwards at an angle and extending from the upper edge of the collar, with free ends of the wings positioned close to the inner surface of the filter housing at an acute angle in the mounted condition of the filter insert. By the fact that the wings are inwardly elastically flexible and resilient, as the filter insert is taken upwardly out of the filter housing when changing the filter insert, the wings will also adapt to an increasing diameter of the filter housing, such that for practical reasons during the complete removal movement of the filter insert through the cup-shaped filter housing, the inner surface thereof is skimmed by the free ends of the wings. By this skimming, solid particles are skimmed from the inner surface and will proceed into the collecting chamber formed in the lower part of the filter insert in the area encompassed by the collar.

In order to make sure that, when changing the filter insert during the removal of the filter insert, as little as possible or no liquid will remain within the collecting chamber, it is provided that the collar is formed of a liquid permeable material. In this manner, the liquid remaining in the collecting chamber will permeate through the collar and the solid particles collected there will not permeate out of the collecting chamber.

A further embodiment provides that the collar, at least over a part of the surface thereof, is formed as a sieve. Therein it is of no regard whether the material of the collar is liquid permeable or liquid impermeable. By forming at least a part of the surface as a sieve, an accelerated draining of the liquid out of the collecting chamber formed in the interior of the collar is attained, wherein naturally the mesh of the sieve is selected such that the solid particles filtered by the filter material member are completely, or at least for the most part thereof, filtered by the sieve.

In order to make the production of the separate parts of the filter insert, and the connection with each other to a complete filter insert, as time and cost saving and therefore economical as possible, it is proposed that the collar is bonded or welded with the lower front disc or made integral with it. In this way, the solid particles are prevented from migrating between the front disc and the collar. With the integral embodiment, a separate production step for the mounting of the collar when producing the filter insert is not required. The production of the lower front disc, together with the integral collar is, as an example, possible in an injection molding process using a thermal plastic material.

In an alternate embodiment, the collar consists of an elastically flexible compressible material, wherein the thickness of the collar in the non-compressed condition thereof, as measured in radial direction of the filter insert, is larger as measured in the same direction than the width of an annular gap between the inner surface of the filter housing and the outer circumference of the filter insert in the mounted condition thereof. With this embodiment, in the mounted condition of the filter insert, the annular gap is completely sealed against a migration of solid particles, whereas a migration of the liquid is furthermore possible. When the intake of the liquid to be filtered is positioned in an area of the filter housing above the collar, a liquid permeability of the collar in the compressed condition thereof is not required. Also, with a collar shaped in this way, a collection of solid particles filtered during the operation of the liquid filter at the filter material member in the filter insert is attained. At the same time, when removing the filter insert from the filter housing, the inner surface of the housing is cleaned and at the same time, the liquid in the collection chamber in the interior of the collar will drain through the material forming the collar into the filter housing, such that the filter insert removed from the filter housing will be liquid free to a high degree.

A further development of the embodiment mentioned above provides that the inner diameter of the filter housing enlarges from the bottom to the top thereof conically and/or in at least one step, wherein in relation to the lower part of the filter housing, the annular gap becomes larger than the thickness of the collar in the non-compressed compressed condition thereof. With this embodiment, a free annular gap is formed between the collar and the inner surface of the filter housing before the filter insert with the collar attached thereto is completely removed from the filter housing. Thereby a fast drain of liquid from the filter insert is guaranteed when changing the filter insert, resulting in a reduced danger of transporting liquid out of the interior of the liquid filter to the environment.

From practical experience, filter inserts are known which have a protecting cover surrounding the filter material member and the two front discs, with the protecting cover encompassing the outer circumference of the filter material member. To attain a free flow of the liquid to be filtered, the protecting cover, used with such known filter inserts has apertures wherein, as an example, the protecting cover may comprise a cover with apertures or a grid-shaped cover. With regard to such filter inserts, the invention proposes that the collar is formed integral as a part of a protecting cover encompassing the outer circumference of the filter material member over the total height or the largest part thereof, wherein the protective cover in the part thereof forming the collar, is formed without apertures, and is formed with apertures in the part thereof positioned above the collar. With this relatively simple redesign of the protecting cover, appertaining only the lower part thereof in the lower part of the filter insert, a collecting chamber for solid particles filtered at the filter material member is formed.

For forming a sufficiently large collecting chamber in the interior of the collar, it is generally sufficient to have the height of the collar between about 5 and 15% of the total height of the filter insert or the filter material member, respectively. As a material for the collar or the protective cover, respectively, e.g., a liquid resistant paper or a corresponding carton may be used or a plastic material which may be thermically processed without problems, such that after the operation of the filter insert the latter may be thermally processed (incinerated).

BRIEF DESCRIPTION OF THE DRAWINGS

Embodiments of the invention are now further explained referring to a drawing. The figures of the drawing illustrate.

DETAILED DESCRIPTION OF THE PREFERRED EMBODIMENTS

Figure 1:
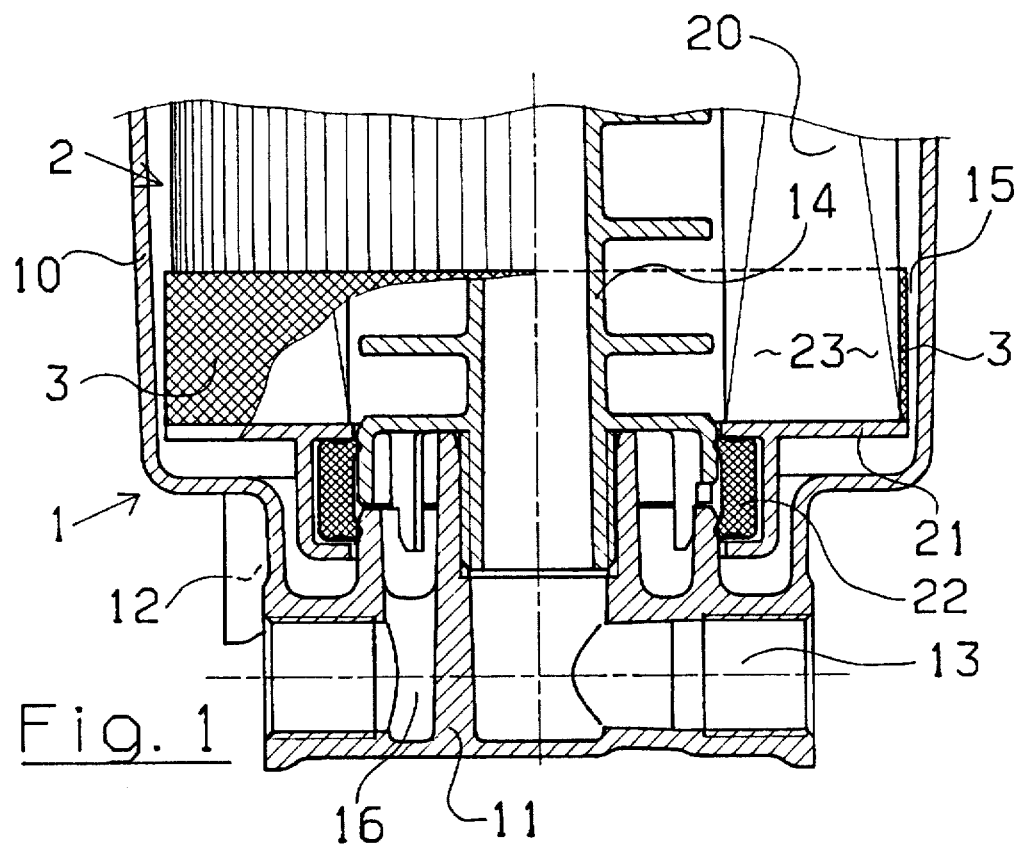
FIG. 1 is a liquid filter with a filter insert in a partly vertical section in a first embodiment.

As illustrated in FIG. 1 of the drawing, the embodiment of a liquid filter 1 illustrated here is formed of a generally cylindrical cup-shaped filter housing 10 arranged in a standing up position, that is, with a vertical axis, with its lower end formed by a filter housing base 11. In the interior of the filter housing base 11, a liquid intake passage 12 for the liquid to be cleaned and a liquid return passage 13 for the cleaned liquid are provided. Furthermore with this embodiment, and also in the following embodiments, a drain passage 16 is provided in the filter housing base 11, with the drain passage 16 serving as the drain for the liquid in the interior of the filter housing 10 when changing the filter insert.

A filter insert 2 is arranged in the interior of the filter housing 10 with the filter insert 2 comprising an essentially hollow cylindrical shape. The filter insert 2 has a filter material member 20 formed of a filter material strip folded in zig-zag or star-shape, with the filter material strip arranged in sealing fashion at the front sides thereof between two front discs 21, of which in the drawing only the lower front disc 21 is illustrated. In the center of the liquid filter 1, a central support member 14 is provided, extending with the inserted filter insert 2, through the hollow interior thereof, and forming a support against the forces occurring when liquid flows through the filter insert 2. Below the lower front disc 21, the filter insert 2 comprises a sealing ring 22 cooperating with the lower part of the central support member 14 and a part of the filter housing base 11 which has essentially the same outer diameter as the lower part of the support member 14. As soon as the filter insert 2 is moved in upward direction, the drain passage 16 mentioned above is connected with the interior of the filter housing 10 such that a drain of the liquid from the interior of the filter housing 10 through the drain passage 16 is possible. Up to this point the illustrated embodiment of a liquid filter corresponds with prior art.

Beyond the known state of the art, in the embodiment illustrated in FIG. 1, a collar 3 is provided on the lower part of the filter insert 2 with the collar 3 extending from the lower front disc 21 and encompassing the filter material member 20 at the outer circumference thereof. The collar 3 consists of an annular flat strip of a fluid resistant material, e.g., a suitable paper or carton or a plastic material, e.g., polyethylene or polyamide, and may at the lower edge thereof be glued or welded with the front disc. The material of the collar 3 may be liquid impermeable or also liquid permeable. In the latter case, the material of the collar 3 is selected such that it is impermeable with respect to solid particles which have been intercepted out of the liquid to be filtered by the filter material member 20. The collar 3 may also be made integral with the lower front disc 21.

As illustrated in FIG. 1 of the drawing, a collecting chamber 23 is formed by the collar 3 in the lower part of the filter insert 2, with the collecting chamber being only open towards the top and receiving the solid particles intercepted during the operation of the liquid filter 1. Solid particles having sunk into the collecting chamber 23 under the influence of gravity may not leave it under normal operating conditions and are removed upon replacement of the filter insert 2 when the latter is removed from the filter housing 10.

Figure 2:
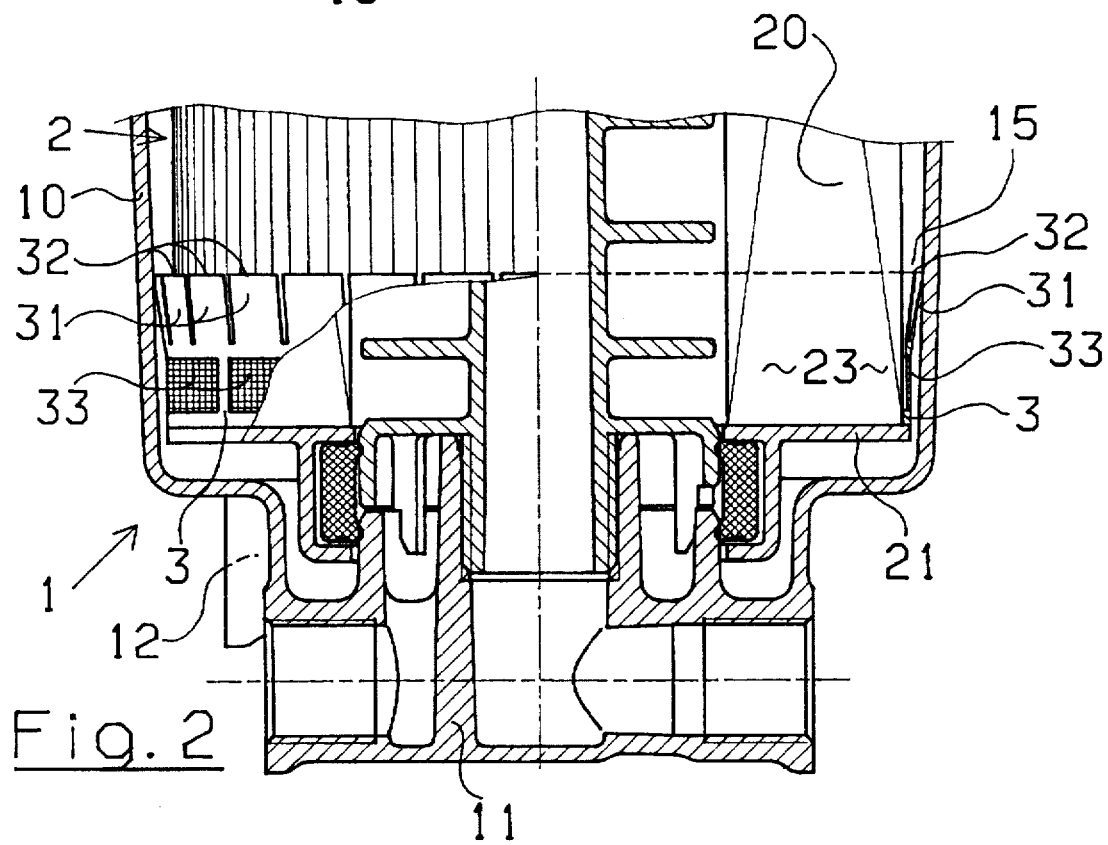
FIG. 2 is a liquid filter with a filter insert in the same view as in FIG. 1 in a second embodiment.

A second embodiment is illustrated in FIG. 2 of the drawing wherein, in this case, the collar 3 is designed with two parts which differ in their functions. The lower part of the collar 3 again is hollow cylindrical in its base shape and sits close to the outer circumference of the filter material member 20, wherein again the collar 3 with the lower edge thereof sits close to the radially outer edge area of the lower front disc 21 of the filter insert 2. In this lower area, the collar 3 is designed with a great number of areas designed as sieves 33. For practical reasons the mesh of the sieves 33 is selected such that intercepted solid particles may not migrate from the collecting chamber 23 through the sieves 33, however, the liquid in the collecting chamber 23 may drain through the sieves 33 when the filter insert 2 is removed from the filter housing 10.

Towards the top, the collar 3 comprises a number of wings 31 closely positioned side by side, with the wings elastically inwardly flexible and resilient and having a bias in an outward direction. Because of this bias and the elastically flexible resilient capacity, the upper free ends 32 of the wings 31 will sit close to or in engagement with the inner surface of the filter housing 10 at an acute angle. With this arrangement, solid particles sinking downwards in the area of an annular gap 15, extending between the outer circumference of the filter insert 2 and the inner surface of the filter housing 10, are guided into the interior of the collecting chamber 23. Further, the wings 31, when the filter insert 2 is removed upwardly from the filter housing 10, will mechanically skim the solid particles sticking to the inner surface of the filter housing 10, with the solid particles subsequently also being guided into the interior of the collecting chamber 23.

Figure 3:
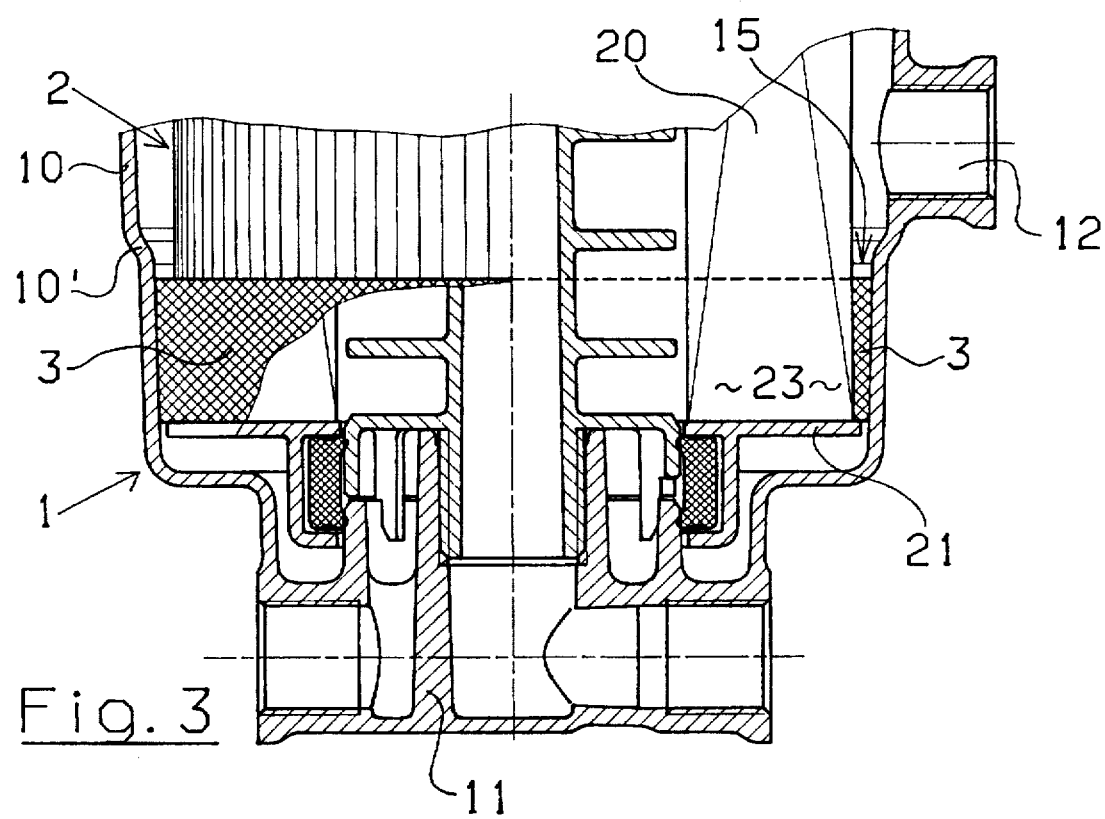
FIG. 3 is a liquid filter with a filter insert in the same view as in FIG. 1 in a third embodiment.

In FIG. 3 of the drawing, an embodiment of a liquid filter 1 is illustrated wherein the filter housing 10 comprises a step 10' at which the inner diameter of the filter housing 10 upwardly enlarges, stepwise. Furthermore it is provided with this embodiment of the liquid filter 1 that the liquid intake passage 12 opens above the step 10' in an essentially radial direction into the filter housing 10.

In this case, the collar 3 consists of a elastically flexible compressible material, e.g., a foam plastic material, wherein the thickness of the collar 3 in the non-compressed condition thereof, as measured in radial direction of the filter insert 2, is larger than the width of the annular gap 15 between the outer circumference of the filter insert 2 and the inner surface of the filter housing 10 close to the lower end of the filter insert 2 in the mounted condition which is shown in FIG. 3. After inserting the filter insert 2 from above into the filter housing 10, the collar 3 is compressed such that it completely fills the annular gap 15. In this way the annular gap 15 becomes impermeable for the solid particles intercepted in the filter material body 20, whereby also in this case, the solid particles are intercepted in the collecting chamber 23. It does not matter with regard to the functioning of the collar 3 in this embodiment whether it consists of material with open pores, i.e., liquid permeable, or of a material with closed pores, i.e., not only tight against solid particles but also liquid tight. However, when using a material with open pores, liquid may flow through the collar 3, particularly in the non-compressed condition thereof, such that a drain of the collecting chamber 23 of the liquid is possible when removing the filter insert 2. When using a material with closed pores for the collar 3, a certain amount of liquid will remain in the collecting chamber 23, which may be permissible under certain circumstances when the fluid to be filtered is not hazardous to the environment.

Furthermore, FIG. 3 illustrates that when removing the filter insert 2 upwards, after a relatively short distance, the collar 3 will move into the area of the filter housing 10 comprising the enlarged inner diameter above the step 10'. In this area the inner diameter of the filter housing 10 is so large that it surpasses the outer diameter of the collar 3 in the non-compressed condition thereof. Thereby a gap between the outer circumference of the collar 3 and the inner surface of the filter housing 10 is formed through which a liquid drain is possible downwards along the collar 3.

Figure 4:
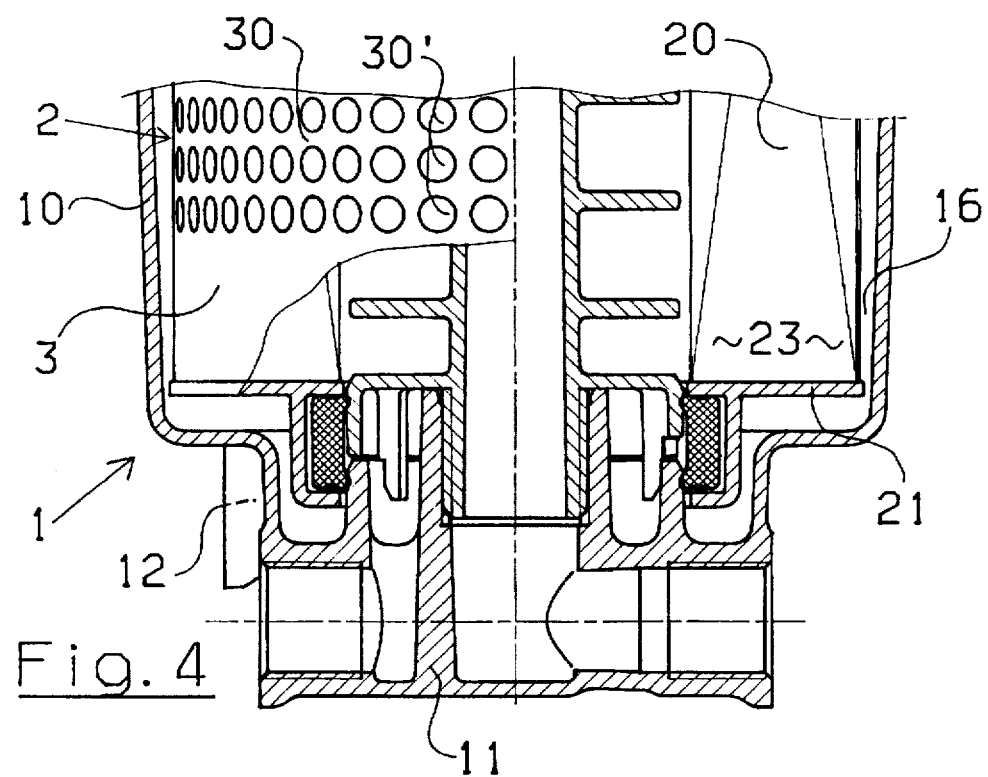
FIG. 4 is a liquid filter with a filter insert in the same view as in FIG. 1 in a fourth embodiment.

Finally, FIG. 4 of the drawing illustrates an embodiment of the liquid filter 1 wherein the filter insert 2 is encompassed by a protecting cover 30, which is known as such, and comprises a great number of apertures 30'. The protective cover 30 encompasses the outer circumference of the filter material member 20 over the total height thereof, wherein in FIG. 4 same as in the other figures, only the lower part of the liquid filter 1, the filter housing 10 and the filter insert 2 is illustrated.

For forming a collecting chamber 23 in this embodiment of the filter insert 2, it is provided that the lower part of the protective cover 30 is formed as a collar 3 with no apertures, wherein in this case an integral embodiment is provided. As an alternative, a separate embodiment of the collar 3 and the protective cover 30 may be considered, wherein selectively these two may be connected with each other or may not be connected but sit close to each other in axial direction. In a further alternative, the collar 3 is placed around the lower part of the protective cover 30, wherein in this case the protective cover 30 may have apertures 30' also in the lower part thereof.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A liquid filter comprising:
    a cup shaped filter housing substantially arranged standing up in operation, the cup-shaped filter housing including an inside surface;
    a releasable cover closing the filter housing;
    at least one liquid intake passage from the filter housing;
    a replaceable, substantially hollow cylindrical filter insert arranged in the filter housing, the filter insert comprising a filter material member arranged between an upper front disc and a lower front disc; and
    a collar extending from the lower front disc, placed around an outer circumference of the filter material member, up to a part of a height of the filter material member, the collar being formed of an elastically flexible compressible material, wherein a thickness of the collar in a non-compressed condition thereof, as measured in radial direction of the filter insert is larger, as measured in said radial direction, than a width of an annular gap between the inside surface of the filter housing and the outer circumference of the filter material member, in a mounted condition thereof, the collar being impermeable to particles being filtered out of a liquid by the filter material member.

2. A liquid filter according to claim 1, wherein the collar consists of a liquid permeable material.

3. A liquid filter according to claim 1, wherein the collar consists of a liquid impermeable material.

4. A liquid filter according to claim 1, wherein the inner diameter of the filter housing enlarges from the bottom to the top thereof, wherein in relation to the lower part of the filter housing, the annular gap becomes larger than the thickness of the collar in the non-compressed condition thereof.

5. A liquid according to claim 4, wherein the inner diameter of the filter housing enlarges conically upwardly.

6. A liquid filter according to claim 4, wherein the inner diameter of the filter housing enlarges stepwise upwardly.

7. A liquid filter according to claim 6, wherein the inner diameter of the filter housing enlarges upwardly in a single step.

8. A replaceable cylindrical liquid filter insert, for use in a vertical orientation within a filter housing, comprising:

a filter material member arranged between an upper front disc and a lower front disc; and a collar extending upwardly from the lower front disc a part of a height of the filter material member, placed around an outer circumference of the filter material member, the collar including sieve means impermeable to particles filtered out of the liquid by the filter material member, the collar further comprising inwardly elastically flexible and resilient wings extending upwardly and outwardly at an angle from an upper edge of the collar and being positioned to extend at an acute angle greater than zero to an inside surface of a filter housing when inserted into the filter housing.

9. A liquid filter insert according to claim 8, wherein the collar comprises a liquid impermeable material.

10. A liquid filter comprising:

a cup-shaped filter housing substantially arranged standing up in operation;

a releasable cover closing the filter housing;

at least one liquid intake passage into the filter housing;

a liquid return passage from the filter housing;

a replaceable, substantially hollow cylindrical filter insert arranged in the filter housing, the filter insert comprising a filter material member arranged between an upper front disc and a lower front disc; and a collar extending from the lower front disc, placed around an outer circumference of the filter material member, up to a part of a height of the filter insert, the collar including sieve means impermeable to particles filtered out of the liquid by the filter material member, the collar further comprising elastically flexible and resilient wings extending upwardly and outwardly at an angle from an upper edge of the collar, with free ends of the wings being positioned close to an inner surface of the filter housing, at an acute angle greater than zero to the inner surface, in a mounted condition of the filter insert.

11. A liquid filter comprising:

a generally cylindrical cup-shaped filter housing having a vertical axis when in a mounted condition;

a releasable cover closing the filter housing;

a liquid intake passage into the filter housing;

a liquid return passage from the filter housing;

a replaceable, substantially hollow cylindrical filter insert arranged in the filter housing, the filter insert comprising a filter material member positioned between an upper front disc and a lower front disc; and a collar extending from the lower front disc, placed around an outer circumference of the filter material member, partially along a height of the filter insert, the collar including sieve means impermeable to particles filtered out of the liquid by the filter material member, the collar further comprising inwardly elastically flexible and resilient wings extending upwardly and outwardly at an angle from an upper edge of the collar, with free ends of the wings being positioned close to an inner surface of the filter housing, at an acute angle at an acute angle greater than zero to the inside surface, in a mounted condition of the filter insert.

* * * * *

UNITED STATES PATENT AND TRADEMARK OFFICE
Certificate

Patent No. 5,718,825                                                             Patented: February 17, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael Greive, Muenster, Fed. Rep. Germany; Wilhelm Ardes, Ascheberg, Fed. Rep. Germany; and Ernst-Wilhelm Hufendiek, Stuttgart, Fed. Rep. Germany.

Signed and Sealed this First Day of December, 1998.

ROBERT A. DAWSON
                                                                                                                                            Art Unit 1712